Nov. 20, 1934. R. E. WENTZELL 1,981,683

INSECT TRAP

Filed March 12, 1934

INVENTOR.
RUSSELL E. WENTZELL.
BY
Albert J. Henderson
ATTORNEY.

Patented Nov. 20, 1934

1,981,683

UNITED STATES PATENT OFFICE 1,981,683

INSECT TRAP

Russell E. Wentzell, Greensburg, Pa.

Application March 12, 1934, Serial No. 715,141

2 Claims. (Cl. 43—113)

This invention relates to insect traps and more particularly to illuminated traps for nocturnal flying insects.

One object of this invention is to attract insects directly into the trap without unnecessary and prolonged swarming therearound.

Another object of the invention is to facilitate the entrance of insects into the trap while rendering their exit practically impossible.

Another object of the invention is to permit the trap to be used in connection with a source of light for general illuminating purposes.

Another object of the invention is to utilize the heat generated by a source of illumination to destroy the insects, thus rendering the use of poison or other dangerous and messy liquids unnecessary.

Another object of the invention is to provide a trap which will be ornamental for porches or other domestic uses while being sturdy in construction and inexpensive and simple to manufacture.

Another object of the invention is to provide a trap which will be equally effective and adaptable for domestic use and for use in open fields or gardens and the like.

Other objects and advantages will become apparent from the following description taken in connection with the accompanying drawing, wherein:—

Figure 1:
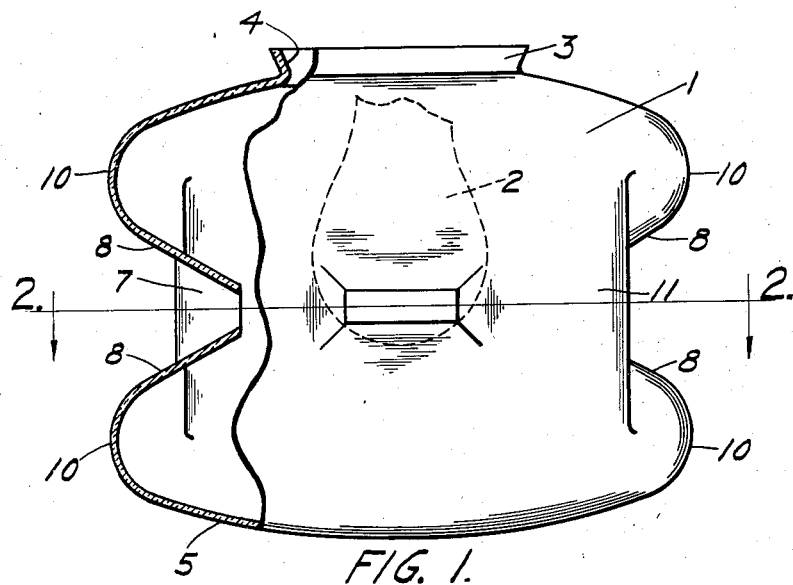
Fig. 1 is a front elevation partly in section of the improved insect trap.

Referring more particularly to the drawing, the trap comprises a casing designated generally by the numeral 1 and which is adapted to surround a source of light, in this instance, the electric light bulb 2. The casing 1 is preferably made of translucent or frosted glass or other similar material, and in the embodiment shown is designed to take the place of the ordinary light globe, such as is used on porches, entranceways, or the like.

To this end, the casing 1 is provided with an annular flange or lip 3 surrounding an opening 4 at one end thereof. The casing can thereby be slipped over the electric light bulb 2 and secured in the usual manner to the light globe socket connection (not shown). The casing 1 is, in this instance, of substantially cylindrical form and provided with an end wall 5 opposite the opening 4. Preferably, the end wall 5 is curved as shown and has its contour blended into the side wall 6 of the casing 1 without sharp edges or projections being formed.

Figure 2:
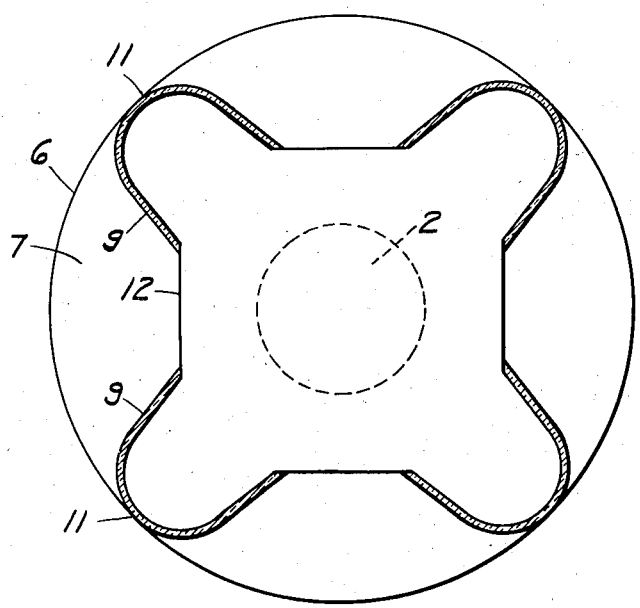
Fig. 2 is a section taken on the line 2—2 of Fig. 1 looking in the direction indicated by the arrows.

The casing 1 is further provided with one or more depressed portions or cavities 7. In the drawing four such cavities are shown, but it will be understood that any desired number may be employed. These cavities 7 are preferably, in this instance, all located in the cylindrical side wall 6 about midway of the ends of the casing 1 and have inwardly converging upper and lower walls 8 and inwardly converging side walls 9. As shown in Fig. 1, the upper and lower walls 8 are arranged to blend into the cylindrical side wall of the casing 1 without forming sharp edges at the junction, there being rounded portions 10 provided for this purpose. The side walls 9 of the cavities 7 are similarly blended into the cylindrical side wall of the casing 1 but, in this instance, longitudinal rib portions 11 are formed between the individual cavities 7 as shown in Fig. 2.

At the bottom of each cavity 7 is an aperture 12 which provides communication between the exterior and the interior of the trap. The apertures 12 are preferably in the form of horizontal rectangular slots so that insects with wings extended may readily enter. The cavities 7 extend as shown towards the center of the casing 1, thus bringing the apertures 12 to within a short distance of the light bulb 2. The light bulb 2 is of the ordinary commercial variety and its size depends, of course, upon the power desired. The size of the casing 1 will be varied to suit conditions and preferences in this regard. However, the exact distance of the apertures 12 from the light bulb 2 is not important, as long as the apertures are fairly close thereto, as shown.

As previously described, the type of trap herein shown and described is designed to take the place of the usual domestic or factory light globe and in use is inserted in the usual socket provided for the latter. As the trap is made of translucent or frosted glass, there will be no diminution of the normal amount of light afforded for illuminating purposes. The insects will be attracted by the glow from the capacious globe and will fly toward it. As the apertures 12 are located directly opposite the light bulb 2, the brighter rays from the light source are exposed and will attract the insects directly towards the apertures without prolonged swarming around the globe.

There is no searching for an opening on the part of the insects because the sides of the trap form a series of curves which will deflect the insects directly toward the openings. The cavities or depressions 7 are of such size that the ribs 11 and rounded portions 10 are relatively narrow and tend to deflect the insects toward the cavities instead of hindering their entrance thereto as would "blind spots" of greater size. When once inside the insects will fly around the larger spaces in the ribs 11 and portions 10 and the heat generated by the source of light will quickly cripple and kill the insects so that objectionable flutterings within the globe are soon terminated.

As the insects are trapped within the casting and retained therein when destroyed, there is no constant falling of insects onto the ground. This is of particular advantage when the device is used on porches or other places where people congregate as will be apparent. For domestic or public use, the device does not detract from the appearance of the lighting fixture but, on the contrary, serves an ornamental as well as utilitarian purpose. Furthermore, there is no necessity for using liquid to destroy the pests so that the uncleanliness and generally objectionable features of such devices are absent.

It will be understood that the invention is not restricted for use in connection with electric light as other illuminating mediums may be employed. The use of the device with acetylene, kerosene or gasoline illumination is an obvious alternative, particularly in orchards, gardens and similar field locations where crops and the like can be protected from the ravages of various nocturnal pests.

With such exposed or other illuminating mediums and when the trap is used on lighting fixtures close to a wall or other similar location it will be apparent that the invention is not limited to the precise embodiment shown for illustrative purposes, but may be modified within the scope of the appended claims.

From the foregoing it will be seen that a simple inexpensive device has been provided which has a variety of uses in connection with the trapping of winged insects, while not detracting from the normal amount of illumination afforded by the source of light, or from the appearance of the lighting fixture. Notwithstanding the fact that apertures are formed in the casing, it is apparent that the device is so designed with ribs and the like that the apertures do not weaken the structure in any way.

I claim:

1. An insect trap, comprising a casing having side and end walls, one of the end walls being open to receive a source of light, said side wall having a plurality of depressions spaced at substantially equal distances one from the other therearound and being midway between the ends of the casing, each of said depressions having converging sides terminating in a horizontal slot exposing the source of light, there remaining a relatively narrow rib of the side wall between adjacent depressions.

2. An insect trap, comprising a substantially cylindrical casing of translucent material having a rounded bottom and top, there being an opening in the top to receive a source of light, the edge of the opening being bordered by a flange for holding the casing in position, the side wall of the casing having a plurality of depressions spaced at substantially equal distances one from the other therearound and being midway between said bottom and top, each of said depressions having converging sides terminating in a horizontal slot exposing the source of light, there remaining a relatively narrow rib of side wall between adjacent depressions extending longitudinally of the casing and merging into the rounded bottom and top to provide contours tending to deflect insects toward the depressions.

RUSSELL E. WENTZELL.